US009523830B2

(12) United States Patent
Matsuoka et al.

(10) Patent No.: US 9,523,830 B2
(45) Date of Patent: Dec. 20, 2016

(54) OPTICAL MODULE AND TRANSMITTING DEVICE

(71) Applicant: Hitachi, Ltd., Tokyo (JP)

(72) Inventors: Yasunobu Matsuoka, Tokyo (JP); Youngkun Lee, Tokyo (JP)

(73) Assignee: HITACHI, LTD., Tokyo (JP)

( * ) Notice: Subject to any disclaimer, the term of this patent is extended or adjusted under 35 U.S.C. 154(b) by 47 days.

(21) Appl. No.: 14/441,650

(22) PCT Filed: Mar. 15, 2013

(86) PCT No.: PCT/JP2013/057346
§ 371 (c)(1),
(2) Date: May 8, 2015

(87) PCT Pub. No.: WO2014/141458
PCT Pub. Date: Sep. 18, 2014

(65) Prior Publication Data
US 2015/0277071 A1  Oct. 1, 2015

(51) Int. Cl.
*H04B 10/12* (2006.01)
*G02B 6/42* (2006.01)
*H04B 10/50* (2013.01)
*H04B 10/80* (2013.01)
(Continued)

(52) U.S. Cl.
CPC .......... *G02B 6/4292* (2013.01); *G02B 6/3897* (2013.01); *G02B 6/428* (2013.01); *G02B 6/43* (2013.01); *H04B 10/501* (2013.01); *H04B 10/801* (2013.01); *G02B 6/4214* (2013.01); *G02B 6/4249* (2013.01)

(58) Field of Classification Search
CPC ............................ H04B 10/501; H04B 10/801
See application file for complete search history.

(56) References Cited

U.S. PATENT DOCUMENTS 6,250,820 B1   6/2001   Melchior et al.
6,270,263 B1   8/2001   Iwase et al.
(Continued)

FOREIGN PATENT DOCUMENTS

JP   10-206698 A   8/1998
JP   2001-513216 A   8/2001
(Continued)

*Primary Examiner* — Dzung Tran
(74) *Attorney, Agent, or Firm* — Volpe and Koenig, P.C.

(57) ABSTRACT

A parallel optical module includes a light-emitting or light-receiving element array 101 placed on a substrate 100, an optical connector 103 optically connecting the optical element array 101 and an external optical fiber array 105, the optical connector 103 having a shape of at least an octahedron which is bilaterally symmetrical about the center of the outer shape thereof viewed along the optical axis direction, and an engaging member 104 placed on the same substrate 100 as the substrate on which the optical element array 101 is mounted, the engaging member having a groove onto which the optical connector 103 is fitted. A side wall of the groove of the engaging member 104 has an inclination corresponding to, among each surface of the optical connector 103, a second surface 110 adjacent to a first surface 109 facing the optical element array 101 in the direction perpendicular to the substrate.

5 Claims, 8 Drawing Sheets

(51) Int. Cl.
  *G02B 6/38* (2006.01)
  *G02B 6/43* (2006.01)

(56) References Cited

U.S. PATENT DOCUMENTS

| | | | |
|---|---|---|---|
| 2001/0041034 A1* | 11/2001 | Sasaki | G02B 6/30 385/88 |
| 2006/0233497 A1 | 10/2006 | Hoshino et al. | |
| 2008/0008426 A1* | 1/2008 | Nagasaka | G02B 6/4214 385/92 |
| 2009/0252455 A1 | 10/2009 | Ohta et al. | |
| 2012/0207427 A1* | 8/2012 | Ito | G02B 6/4261 385/14 |
| 2013/0089290 A1* | 4/2013 | Sloey | G02B 6/3817 385/74 |
| 2015/0323747 A1* | 11/2015 | Leigh | G02B 6/38 385/61 |

FOREIGN PATENT DOCUMENTS

| | | |
|---|---|---|
| JP | 2004-264362 A | 9/2004 |
| JP | 2009-053282 A | 3/2009 |
| JP | 2009-104096 A | 5/2009 |
| JP | 2011-247951 A | 12/2011 |
| JP | 2011-257660 A | 12/2011 |
| JP | 2012-013726 A | 1/2012 |
| JP | 2012-141471 A | 7/2012 |

\* cited by examiner

OPTICAL MODULE AND TRANSMITTING DEVICE

TECHNICAL FIELD

The present invention relates to a parallel optical module which functions as a send-receive part at the time of transmitting a high-speed optical signal sent/received between chips or boards in equipment, such as a data processor, or between pieces of equipment. The present invention also relates to an optoelectric hybrid board and a device which perform optical and electrical signal processing by using the parallel optical module.

BACKGROUND ART

Recently, a high-speed broadband service such as a Fiber To The Home (FTTH) system and cloud computing for general users have been spreading. Accordingly, information technology (IT) equipment such as a server, a router, or a switch in a data center is rapidly increasing in speed and capacity. Under the circumstances, an electric interconnect which has traditionally been used in IT equipment or between pieces of IT equipment is demanded to have transmission capacity of 10 to 25 Gbps or more per channel. However, the limit of speed of the electric interconnect has become a problem, for reasons such as a malfunction of equipment caused by generation of high frequency noise due to increased speed, and a need for a new waveform-regulating element and the like, arising from generation of transmission loss of a high frequency signal. Meanwhile, light is non-inductive, which does not cause a noise or a crosstalk to generate among a plurality of optical signal transmission lines arranged in parallel. Additionally, light is easy to control, as a modulation frequency thereof is unrelated to reflection and loss. Therefore, if a multichannel parallel and high-speed signal transmission line becomes fiber-optic in equipment or between pieces of equipment, a high frequency signal of 10 Gbps or more is able to be propagated with low loss. This reduces the number of wiring lines, and avoids the need for the abovementioned measures for high frequency signals. For these reasons, optical transmission is a promising solution. Furthermore, video equipments such as a video camera, and in consumer equipments such as a personal computer (PC) or a mobile phone, as well as in a router and a switch mentioned above, video signal transmission between a monitor and a terminal is demanded to increase in speed and capacity, with the future development of high-definition images. In addition, the problem of a measure for a signal delay or a noise in conventional electric wiring will become conspicuous. Therefore, it is effective to convert a signal transmission line to an optical fiber.

To achieve a high-speed optical wiring system described above, and to apply such system in equipment or between pieces of equipment, it is necessary to obtain an optical module or an optical circuit which are manufactured in a low cost way, but are excellent in performance, compactness and integration, and component packaging. Then, there is proposed a small-sized and high-speed optical module having a substrate on which an optical component and an optical fiber connector are integrally mounted.

PTL 1 discloses, as an example of a conventional form of an optical module applicable to an optical wiring system, a package configuration of a small integrated optical module having a package substrate on which an optical element array, an integrated circuit, and an optical connector are mounted. In this example, for the purpose of miniaturizing and highly densifying the optical module, an optical connector is mounted three-dimensionally on a substrate on which a multichannel optical element array and an integrated circuit are packaged. In addition, a positioning pin placed on the substrate is inserted into a positioning hole formed in an optical connector, whereby the optical element array and an optical fiber array are optically connected in a simple fashion.

CITATION LIST

Patent Literature

PTL 1: JP 2009-053282 A

SUMMARY OF INVENTION

Technical Problem

In the optical module disclosed in PTL 1, the accuracy of optical connection between the optical element and an optical fiber depends on packaging accuracy of a positioning pin and an optical element provided on an optical element supporting substrate, and on machining accuracy of a positioning hole and a fiber provided on a holding member (an optical connector). Therefore, it is difficult to optically connect the multichannel optical elements and the optical fibers in a highly-efficient and collective manner, due to repeated variations in component processing and packaging, and deformation of a component caused by change in ambient temperature. Moreover, it is anticipated that the above problem will be more conspicuous, given the future increase in application of multichannel systems, and optical connection to an optical element which has a reduced diameter in order to meet demand for high speed.

Furthermore, in the optical module of PTL 1, the holding member (the optical connector) is placed, from above, so as to cover the optical element supporting substrate. This makes it impossible to place a heat radiation fin on the optical element supporting substrate, structurally hindering sufficient heat radiation from an integrated circuit (IC) by air cooling.

In view of the foregoing, an object of the present invention is to provide a parallel optical module which is capable of optically-connecting an optical fiber connector and an optical element on a substrate in a simple yet highly accurate fashion, enabling an integrated circuit to be cooled from above, in addition to decreasing in size by densely packaging, on the substrate, a multichannel optical element array, the integrated circuit, and signal wiring. Another object of the present invention is to provide an optical interconnection system board and a device, which use the parallel optical module to perform signal processing on the board.

Solution to Problem

To solve the above problem, a configuration described in the claims is employed, for example. A plurality of solutions to the problem is offered in the present application. As one of such solutions, there is provided an optical module including a substrate, an optical element placed on the substrate, an optical connector configured to optically connect the optical element and an external optical fiber, and an engaging member placed on the substrate, onto which the optical connector is fitted. The optical connector has a bottom surface facing a substrate top surface, and first to fourth surfaces each adjacent to the bottom surface. A first angle between the first surface and the bottom surface, and a second angle between the second surface and the bottom surface are both obtuse angles.

There is also provided an optical module including a substrate, an optical element placed on the substrate, an optical connector configured to optically connect the optical element and an external optical fiber, the optical connector having a tapered surface, and an engaging member placed on the substrate, onto which the optical connector is fitted, the engaging member having a surface facing the tapered surface. The optical connector has an underside surface facing the engaging member, and a top surface located on the opposite side of the underside surface. The top surface has a larger area than the underside surface.

Advantageous Effects of Invention

The present invention provides an optical module capable of reducing optical misalignment, even if the optical module is thermally deformed.

DESCRIPTION OF EMBODIMENTS

Embodiments of the present invention are described in detail below, with reference to the attached drawings.

First Embodiment

Figure 1:
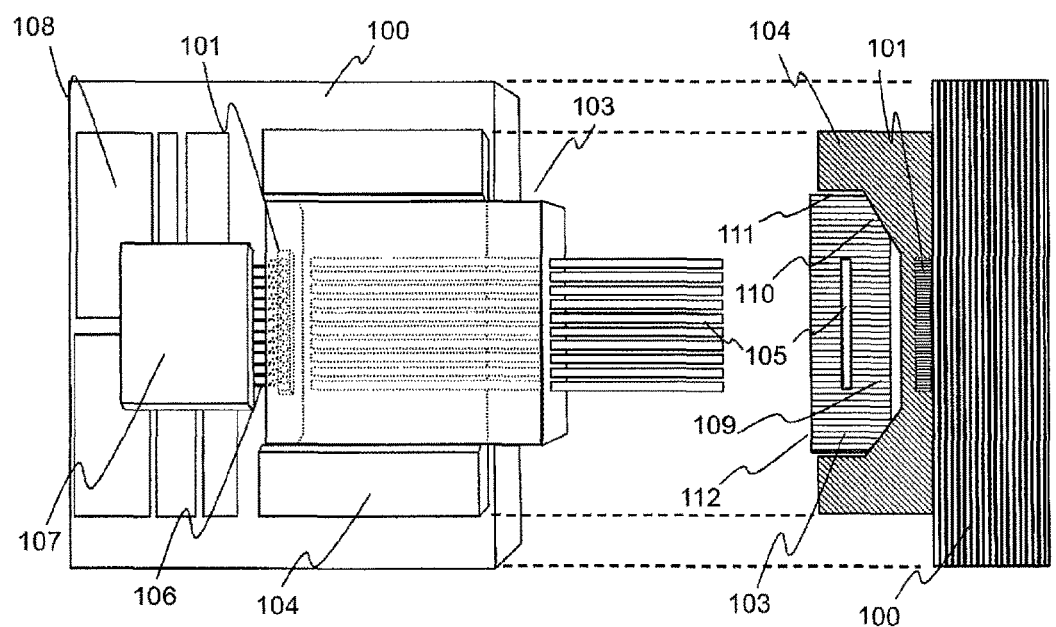
FIG. 1 is a top view showing a parallel optical module according to a first embodiment of the present invention.

FIG. 1 is a schematic view showing a parallel optical module according to a first embodiment of the present invention. In the embodiment, an optical element array 101 of at least two channels, and an integrated circuit 107 which drives an optical element are placed on a substrate 100. The optical element array 101 includes a light-emitting or light-receiving diode. The optical element array 101 and the integrated circuit 107 are electrically connected to each other via electric wiring 106 on the substrate 100. Material for the substrate 100 is not particularly specified. For example, ceramic and glass epoxy may be used. Further, the substrate 100 may have either a single layer structure, or a multi-layer substrate structure in which a wiring layer and an insulation layer are laminated with each other to form multiple layers. In addition, on a surface of the substrate 100, there are formed a power supply to the integrated circuit 107, a ground (GND), and electric wiring 108 such as a signal line, as well as electric wiring 106 for connecting the optical element array 101 and the integrated circuit 107.

Furthermore, an optical connector 103 and an engaging member 104 are placed on the substrate 100, as optical members. An optical fiber array 105 is attached to the optical connector 103. The optical connector 103 is mechanically fitted onto the engaging member 104. As a result, the optical element array 101 and the optical fiber array 105 are optically connected.

Figure 2:
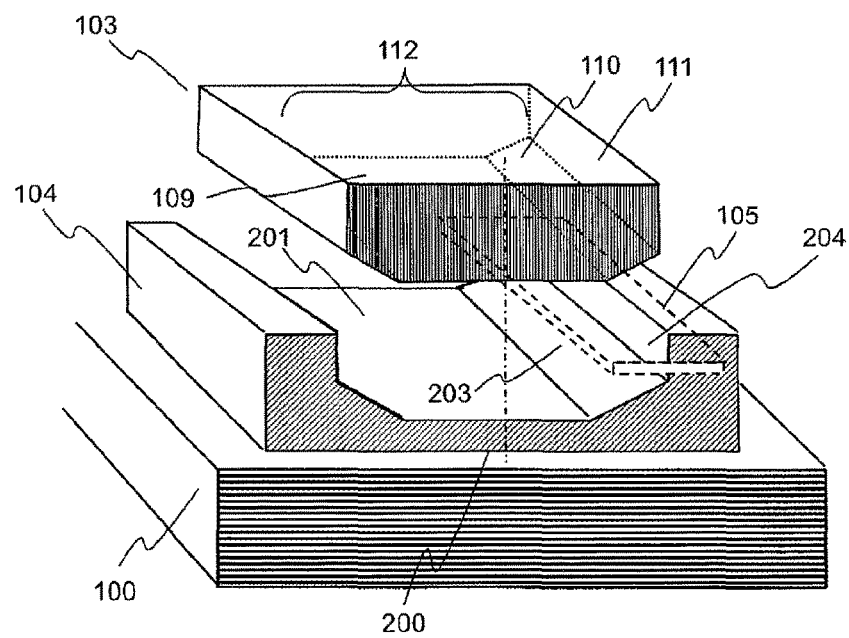
FIG. 2 is a perspective view showing an optical connector and an engaging member included in the parallel optical module according to the first embodiment of the present invention.

Next, structures of the optical connector 103 and the engaging member 104 are described in detail, with reference to FIG. 2. FIG. 2 is a perspective view showing the optical connector and the engaging member included in the parallel optical module of the present invention. As shown in FIG. 2, the optical connector 103 has an octahedron structure. The optical connector 103 has a surface which narrows in the direction from the substrate top surface to the substrate underside surface (a tapered surface). The tapered surface is located on the optical connector 103 in a bilaterally symmetrical manner with respect to the center of the outer shape of the optical connector viewed along the direction of the optical axis. It is obvious, however, that the optical connector 103 is not necessarily be in the shape of an octahedron. Effects of the present invention are provided that the optical connector 103 is formed to have a tapered surface at which the optical connector is fitted onto the engaging member 104. The tapered surface mentioned herein corresponds to a surface 110 in FIG. 1. The tapered surface 110 is formed in such a manner that a cross section of the optical connector narrows in the direction from a top surface 112 of the optical connector toward an underside surface 109 of the optical connector. In other words, the tapered surface 110 is formed in such a manner that the area of the underside surface 109 of the optical connector is smaller than the area of the top surface 112 of the optical connector. As is obvious from FIG.

1, an angle between the tapered surface 110 and the underside surface 109 is an obtuse angle.

Additionally, the optical connector 103 has, as part of the surfaces forming the optical connector 103, a first surface 109 facing the optical element array 101 in the vertical direction of the substrate, a second surface 110 adjacent to the first surface 109, a third surface 112 located on the opposite side of the first surface 109, and a fourth surface 111 adjacent to both of the second surface 110 and the third surface 112.

Further, the engaging member 104 is formed to have a groove with a side wall, each part of which corresponds to each of the aforementioned surfaces of the optical connector 103. Specifically, the first surface 109, the second surface 110, and the fourth surface 111 correspond to a first groove portion 201, a second groove portion 203, and a third groove portion 204, respectively. Among the above surfaces and groove portions, the second surface 110 and the second groove portion 203 come in contact with each other, so that the optical connector 103 and the engaging member 104 engage with each other.

Figure 9:
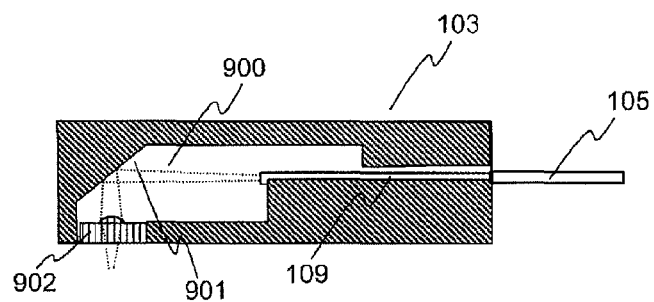
FIG. 9 is a sectional view of an optical connector according to the first embodiment of the present invention.

FIG. 9 shows a sectional view of the optical connector of the present invention. As shown in FIG. 9, the optical connector 103 to be used in the parallel optical module of the present invention has inside an oblique mirror 901 for optical path conversion, which changes the direction of propagation light from a horizontal direction to a vertical direction, or vice versa, and a lens member 902 which collects such propagation light. By using the optical connector 103, the parallel optical module is miniaturized, as the optical connector is placed three-dimensionally from above the optical element array and the integrated circuit element packaged on the same substrate.

Figure 4:
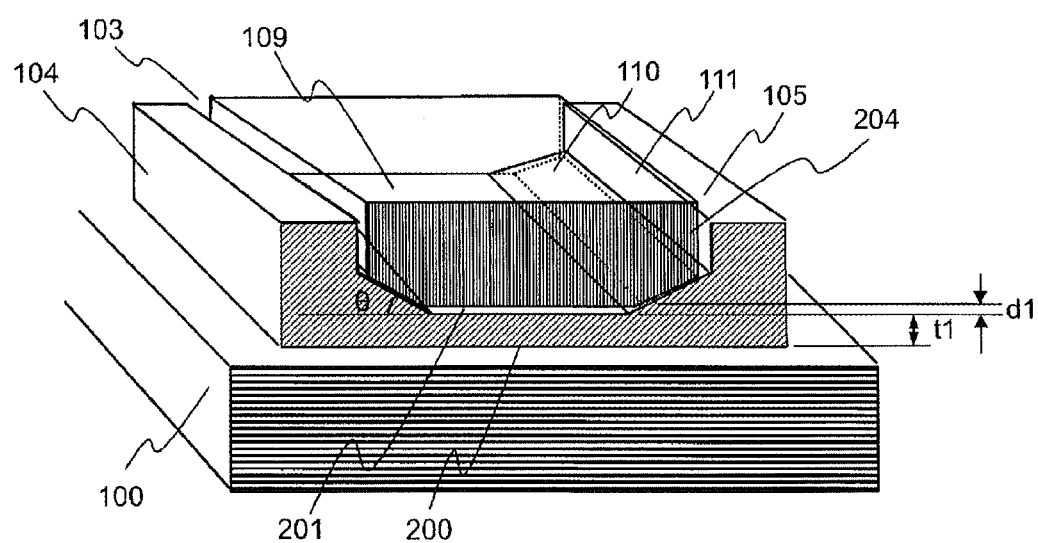
FIG. 4 is a perspective view showing an optical connector and an engaging member included in a parallel optical module according to a third embodiment of the present invention.

In the embodiment, as shown in FIG. 4, there is a hollow wall d1 between the first surface 109 of the optical connector and a second bottom surface 201 of the engaging member 104. This structure is described in detail below, with reference to FIG. 5.

Figure 5:
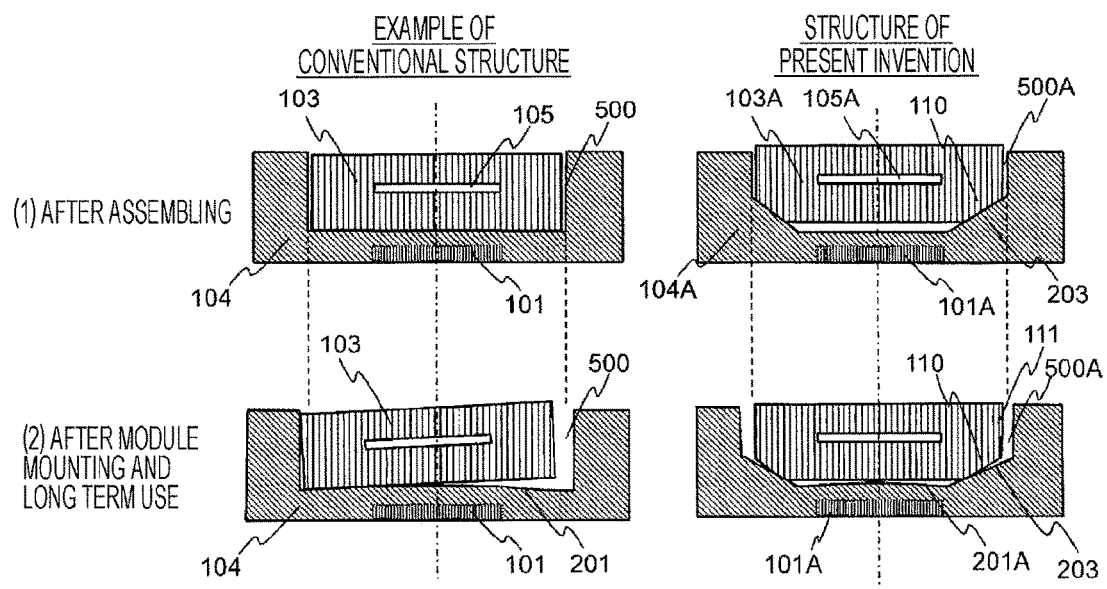
FIG. 5 shows sectional views of optical connectors and engaging members, for explaining effects of the parallel optical module according to the third embodiment of the present invention.

FIG. 5 shows sectional views of optical connectors and engaging members, for explaining effects of the parallel optical module according to the embodiment. The left drawing of FIG. 5 shows an example of a conventional structure. In the conventional structure, a groove portion of an engaging member 104 makes a vertical side wall, and an optical connector 103 in the shape of a tetrahedron is placed so as to be fitted onto the engaging member 104. As shown in the left drawing, in an assembled state (1), the optical connector 103 and the engaging member 104 are joined and fit together with a desired clearance (of about several micrometers (μm)). However, the clearance 500 between the optical connector 103 and the engaging member 104 undesirably increases due to application of heat at the time of mounting the optical module on a board, or due to deformation of a component after a long term use (2). In addition, a bottom surface 201 of the engaging member may have a warp and a deflection caused by thermal deformation and the like. In the conventional structure example, the above problems lead to misalignment of the optical connector 103 as shown in the drawing. This obstructs highly accurate optical positioning between the optical element array 101 and the optical fiber 105.

On the other hand, in a structure of the present invention shown in a right side drawing of FIG. 5, positions of an optical connector 103A and an engaging member 104A are determined by a state of fitting a second surface 110 of the optical connector 103A to a second groove portion 203 of the engaging member 104A. Therefore, even in the case of application of heat at the time of mounting an optical module on a board, or deformation of a component after a long term use (2), the optical connector 103A moves vertically, but does not deviate significantly in horizontal direction from the position in an assembled state (1), as the second surface 110 and the second groove portion 203 are engaged with each other.

Additional explanation is provided here as to deformation of the aforementioned member. In the case of plastic resin or the like used as a molding material, for example, it is highly conceivable that thermal expansion deformation of 10 μm or more occurs, as a result of application of heat of 100° C. or more. Meanwhile, optical position accuracy between an optical element array and an optical fiber is required to be up to ±10 μm. Therefore, in the above conventional structure example, efficiency degradation of optical coupling due to thermal deformation of a component becomes remarkable. Furthermore, it is expected that an optical module to be mounted on a board is required to be a socketless type module which enables solder reflow packaging, in order to densely arrange a plurality of modules, and to mitigate loss in an electric connector part. As a high temperature of 200° C. or more is applied to such optical module, the above-mentioned problem of thermal deformation will be more conspicuous.

As has been previously described, the configuration of the parallel optical module according to the embodiment significantly improves reduction of optical misalignment between an optical element array and an optical fiber caused by component deformation due to heat and secular change.

In view of the foregoing, the optical connector described in the embodiment includes, a substrate, an optical element placed on the substrate, an optical connector configured to optically connect the optical element and an external optical fiber, and an engaging member placed on the substrate, onto which the optical connector is fitted. The optical connector has a bottom surface facing a substrate top surface, and a first to fourth surfaces each adjacent to the bottom surface. A first angle between the first surface and the bottom surface, and a second angle between the second surface and the bottom surface are both obtuse angles.

In the embodiment, the engaging member 104 and the optical connector 103 are in contact with each other at a surface which is neither parallel nor at right angle to the substrate top surface (the tapered surface 203 in FIG. 2), to be aligned with each other. Therefore, even if a bottom surface 201 of the engaging member is deformed by heat, the inclination angle of the tapered surface 203 remains unchanged, and thus misalignment due to thermal deformation is suppressed. As the engaging member 204 and the optical element are mounted on the substrate at the same timing, the engaging member 204 is more likely to be affected by heat than the connector 103. Consequently, the present invention provides a useful measure to prevent misalignment due to thermal deformation.

In addition, the embodiment enables the parallel optical module to be miniaturized, by densely packaging the multichannel optical element array 101, the integrated circuit 107, and the electric wirings 106, 108 on the same substrate 100, and by placing the optical connector 103 three-dimensionally thereabove. Moreover, the embodiment makes it possible to optically connect the optical connector 103 and the optical element array 101 on the substrate 100 in a simple yet highly accurate fashion, by fitting the optical connector 103 to the engaging member 104 placed on the substrate 100. The optical connector 103 has an octahedron structure which is bilaterally symmetrical about the center of the outer shape of the optical connector 103 viewed along the direction of the optical axis.

Second Embodiment

Figure 3:
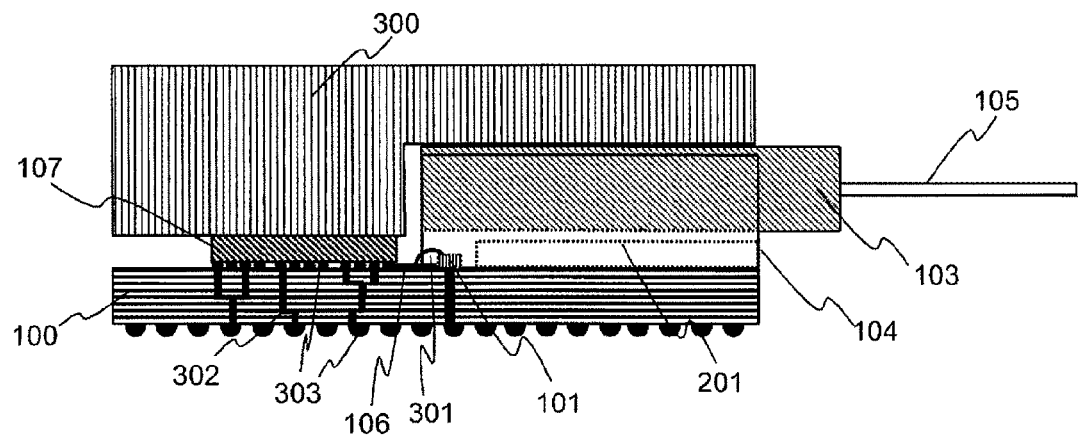
FIG. 3 is a sectional view showing a parallel optical module according to a second embodiment of the present invention.

FIG. 3 is a sectional view showing a parallel optical module according to a second embodiment of the present invention. In the embodiment, an optical element array 101 is on a substrate 100. Also, an integrated circuit element 107 which drives the optical element array is provided closely to the optical element array on the substrate. As shown in FIG. 3, the optical element array 101 and the integrated circuit element 107 are electrically connected by a wire 301 and electric wiring 106, and the like. Electrical connection for a power supply to the integrated circuit element 107 and GND wiring is made through a bump on the integrated circuit element 107, electric wiring 302 provided inside the substrate 100, a bump 303 placed on an underside surface of the substrate, and the like.

As shown in FIG. 3, the engaging member 104 is placed on the substrate 100 so as to face the integrated circuit element 107 with the optical element array 101 in between (on the right side of the optical element array on FIG. 3). The optical connector 103 to be connected to the engaging member 104 is placed such that an end part of the optical connector is located directly above the optical element array 101. Additionally, a metal member 300 having surfaces at different levels is placed on upper parts of the integrated circuit element 100 and of the optical connector 103 connected to the engaging member 104. The surfaces of the metal member 300 each correspond to upper surfaces of the integrated circuit element 107 and the optical connector 103 which differ in height.

With the configuration of the parallel optical module in the embodiment, heat from the integrated circuit element 107 is radiated from the upper part thereof through the metal member 300 without being interfered by the optical connector 103. Moreover, as described above, the metal member 300 having surfaces at different levels is placed so as to correspond integrally to upper surfaces of the integrated circuit element 107 and the optical connector 103 which have different heights. As a result, cooling the integrated circuit element 107 and fixing the optical connector 103 are performed simultaneously. Consequently, reduction in the number of components and miniaturization of the optical module are both achieved.

Third Embodiment

FIG. 4 is a perspective view showing an optical connector and an engaging member included in a parallel optical module according to a third embodiment of the present invention. As shown in FIG. 4, in the engaging member, a distance t1 between a first bottom surface 200 which is in contact with the substrate 100 and a second bottom surface 201 located on the opposite side to the first bottom surface is larger than the thickness of an optical element array placed on the same substrate. With this configuration, a desired optical distance is secured between the optical connector 103 and the optical element array, avoiding contact between the optical connector 103 and the optical element array, when the optical connector 103 is fitted onto the engaging member 104, to be placed above the optical element array.

As shown in FIG. 4, there is a hollow wall d1 between the first surface 109 of the optical connector and a second bottom surface 201 of the engaging member 104. This structure is described in detail below, with reference to FIG. 5.

FIG. 5 shows sectional views of optical connectors and engaging members, for explaining effects of the parallel optical module according to the third embodiment of the present invention. The left drawing of FIG. 5 shows an example of a conventional structure. In the conventional structure, a groove portion of the engaging member 104 makes a vertical side wall, and an optical connector 103 in the shape of a tetrahedron is placed so as to be fitted onto the engaging member 104. As shown in the left drawing, in an assembled state (1), the optical connector 103 and the engaging member 104 are joined and fit together with a desired clearance (of about several micrometers (μm)). However, the clearance 500 between the optical connector 103 and the engaging member 104 undesirably increases due to application of heat at the time of mounting the optical module on a board, or due to deformation of a component after a long term use (2). In addition, a bottom surface 201 of the engaging member may have a warp and a deflection caused by thermal deformation and the like. In the conventional structure example, the above problems lead to misalignment of the optical connector 103 as shown in the drawing. This obstructs highly accurate optical positioning between the optical element array 101 and the optical fiber 105.

On the other hand, in a structure of the present invention shown in a right side drawing of FIG. 5, positions of the optical connector 103A and the engaging member 104A are determined by a state of fitting a second surface 110 of the optical connector 103A to a second groove portion 203 of the engaging member 104A. Therefore, even in the case of application of heat at the time of mounting an optical module on a board, or deformation of a component after a long term use (2), the optical connector 103A only moves vertically, but does not deviate significantly in horizontal direction from the position in the assembled state (1), as the second surface 110 and the second groove portion 203 are engaged with each other.

Additional explanation is provided here as to deformation of the aforementioned member. In the case of plastic resin used as a molding material, for example, it is highly conceivable that thermal expansion deformation of 10 μm or more will occur, as a result of application of heat of 100° C. or more. Meanwhile, optical position accuracy between the optical element array and the optical fiber is required to be up to ±10 μm. Therefore, in the above conventional configuration example, efficiency degradation of optical coupling due to thermal deformation of a component becomes remarkable. Furthermore, it is expected that an optical module to be mounted on a board is required to be a socketless type module which enables solder reflow packaging, in order to densely arrange a plurality of modules, and to mitigate loss in an electric connector part. As a high temperature of 200° C. or more is applied to such optical module, the abovementioned problem of thermal deformation will be more conspicuous.

As has been previously described, the configuration of the parallel optical module according to the embodiment significantly improves reduction of optical misalignment between the optical element array and an optical fiber caused by component deformation due to heat and secular change.

Fourth Embodiment

FIGS. 6A to 6E are diagrams showing an example of a method for manufacturing a parallel optical module according to a fourth embodiment of the present invention.

Figure 6A:
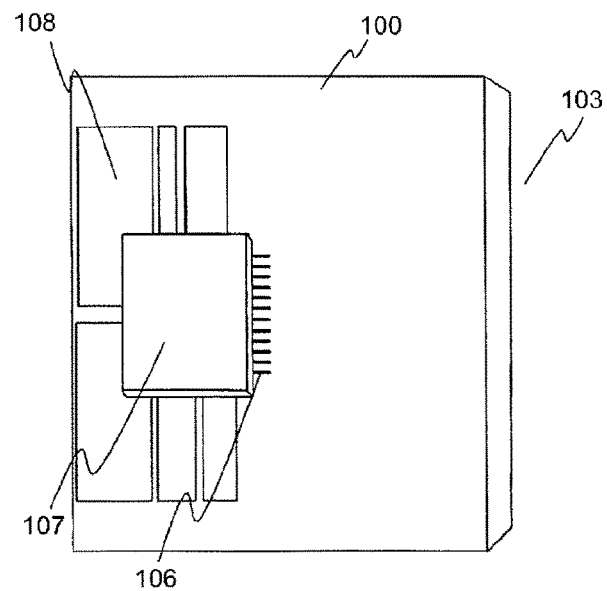
FIG. 6A is a top view showing a process of placing an integrated circuit on a substrate, according to a fourth embodiment of the present invention.

First, as shown in FIG. 6A, an integrated circuit element 107 is placed on a substrate 100. On a top layer of the substrate 100, electric wirings 106, 108 are formed. A method for packaging the integrated circuit element 107 is not particularly mentioned herein. Either flip-chip packaging using a solder bump as shown in FIG. 6A, or packaging by wire-bonding and the like may be applied. In wire-bonding, the integrated circuit element is mounted with a circuit part thereof facing upward.

Figure 6B:
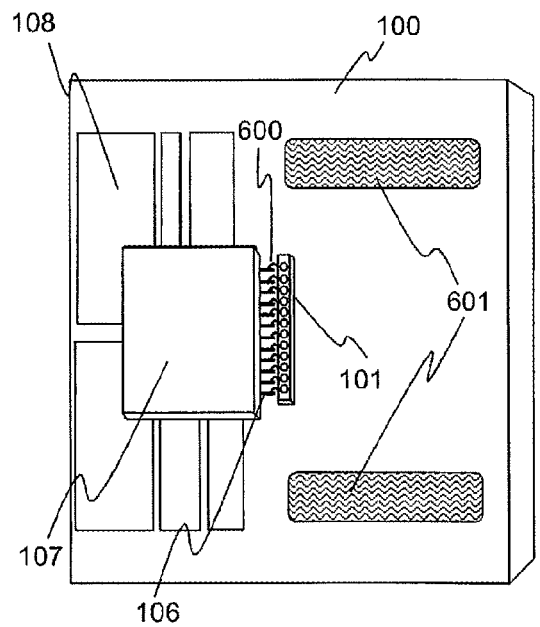
FIG. 6B is a top view showing a process of placing an optical element array on the substrate, according to the fourth embodiment of the present invention.

Next, as shown in FIG. 6B, an optical element array 101 is placed in a desired location in the vicinity of the integrated circuit element 107, such that a light-receiving/emitting part of the optical element array faces upward. Then, an electrode pad of an optical element is bonded to the electric wiring 106 with a wire 600, so that the optical element array 101 and the integrated circuit element 107 are electrically connected. Subsequently, an adhesive 601 is applied in a desired part on the same substrate 100. Although a material for the adhesive is not specifically limited, a resin material which cures by ultraviolet irradiation is desirable.

Figure 6C:
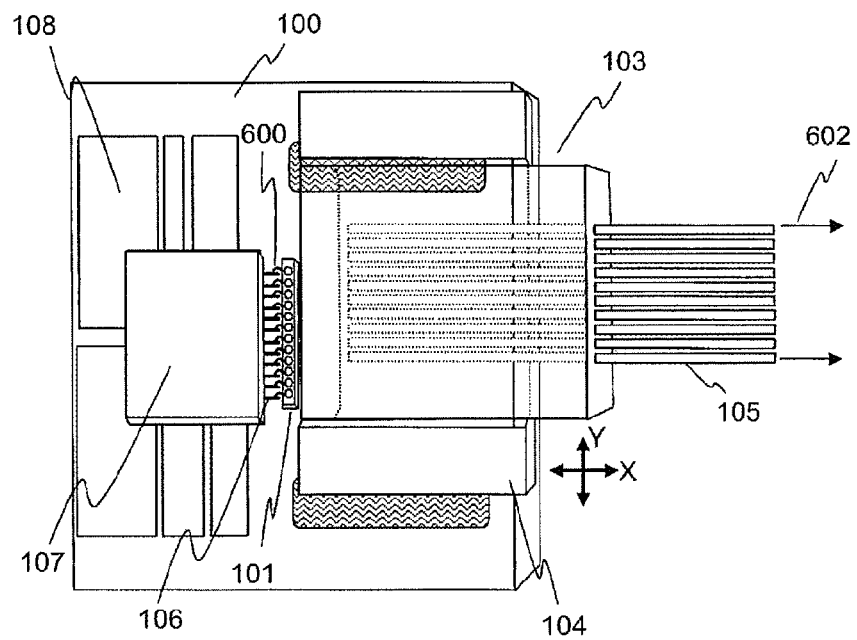
FIG. 6C is a top view showing a process of positioning an engaging member on the substrate, according to the fourth embodiment of the present invention.

Next, as shown in FIG. 6C, a bias is impressed from the integrated circuit element 107 to cause the optical element array 101 to drive (herein, to cause a laser element to emit light). After that, the optical connector 103 being fitted onto the engaging member 104 is moved closer to the optical element array 101 from above. Then, the X axis and the Y axis are moved for optical alignment, while monitoring an optical signal 602 from an optical fiber, so that the maximum light output value can be obtained.

Figure 6D:
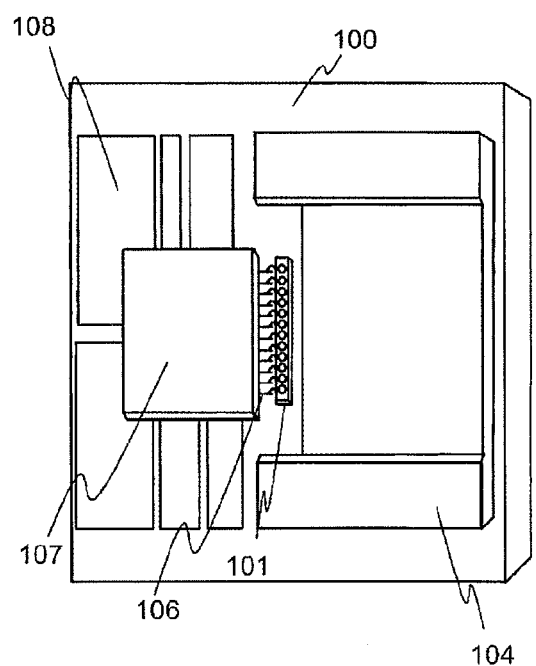
FIG. 6D is a top view showing a process of placing the engaging member on the substrate, according to the fourth embodiment of the present invention.

After determining an optical alignment position in which the maximum light output value is obtained, the engaging member 104 is irradiated with ultraviolet from above, so that the adhesive 601 can be cured. As a result, as shown in FIG. 6D, the engaging member 104 is positioned and fixed. For the reason of the abovementioned manufacturing process, a material having transparency to an ultraviolet light wavelength is applied to the engaging member 104 used in the embodiment.

Figure 6E:
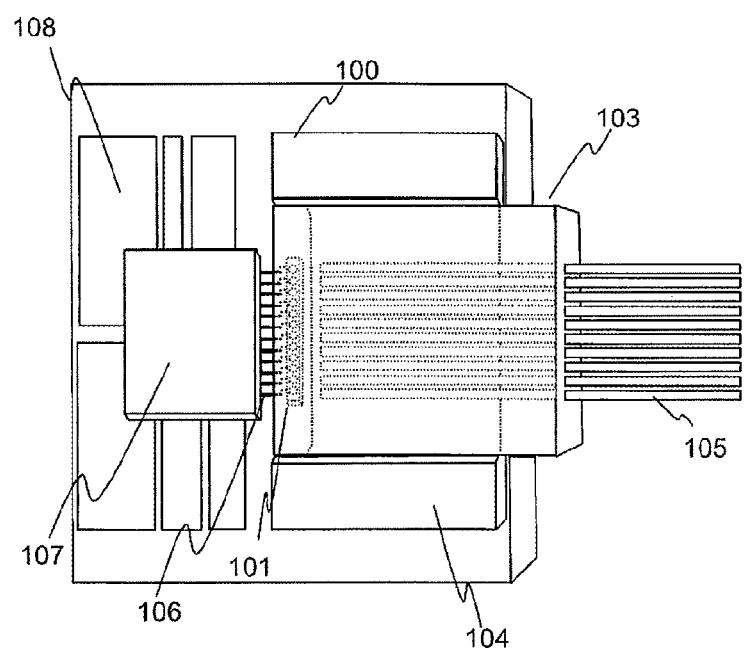
FIG. 6E is a top view showing a process of engaging the engaging member and an optical connector with each other, according to the fourth embodiment of the present invention.

In the above-described state as shown in FIG. 6D, the optical module is placed on a board and the like. Finally, as shown in FIG. 6E, the optical connector 103 is joined to the engaging member 104, and then fixed with a metal member placed from above, which completes the parallel optical module of the present invention.

By the manufacturing process described in the embodiment, the optical connector and the optical element on the substrate are optically connected in a simple yet highly accurate fashion, whereby achieving a small-sized parallel optical module which enables the integrated circuit to be cooled from above.

Fifth Embodiment

Figure 7:
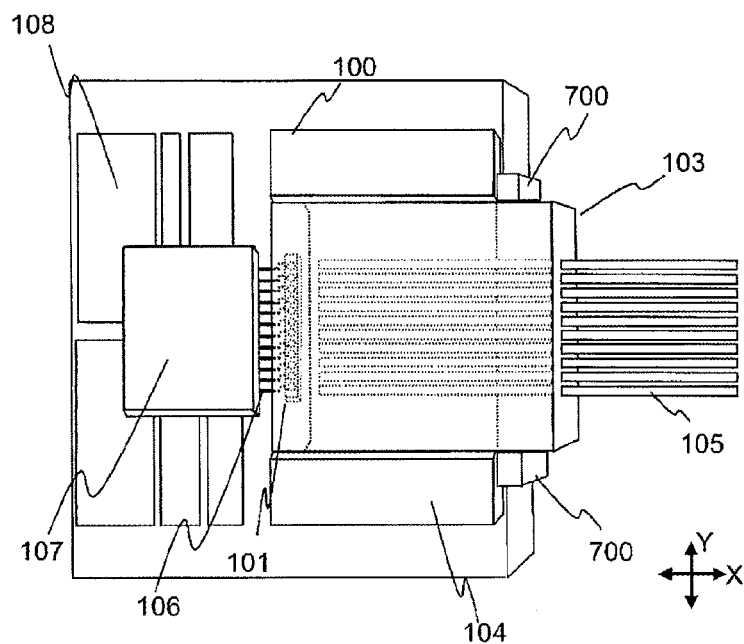
FIG. 7 is a top view showing a parallel optical module according to a fifth embodiment of the present invention.

FIG. 7 is a top view showing a parallel optical module according to a fifth embodiment of the present invention. When an optical element array 101 and an optical fiber 109 are horizontally aligned, it is the most appropriate to perform highly accurate positioning to adjust horizontal misalignment not only in the direction of channel arrangement in the optical element array 101 (Y-direction) which has been previously described, but also in the direction along an optical axis of an optical fiber (X-direction). In an example shown in FIG. 7, a projection part 700 is formed in a desired position on each of the right and left sides of the optical connector 103, in such a manner that positioning in the X-direction is done when a side wall of an engaging member and the projection part 700 come into contact. While a method for forming the projection part 700 of the optical connector 103 is not particularly limited, the projection part and the optical connector are manufactured integrally by a method such as molding, in order to increase component accuracy. A side wall has a fifth surface 801 adjacent to a second surface which is one of the surfaces of the optical connector 103. The second surface adjoins a first surface 109 which faces the optical element array 101 in the direction perpendicular to the substrate. The fifth surface 801 adjoins the second surface at a ninety degree angle in a horizontal direction of the optical connector 103. In this configuration, the fifth surface 801 of the optical connector 104 is fitted onto a side wall surface 800 of the engaging member, to accomplish positioning in X-direction.

With this configuration, highly accurate optical positioning is achieved, with respect to horizontal misalignment between the optical element array 101 and the optical fiber 105, in the both directions of channel arrangement (Y-direction) and of the optical axis of the optical fiber (X-direction).

Sixth Embodiment

Figure 8:
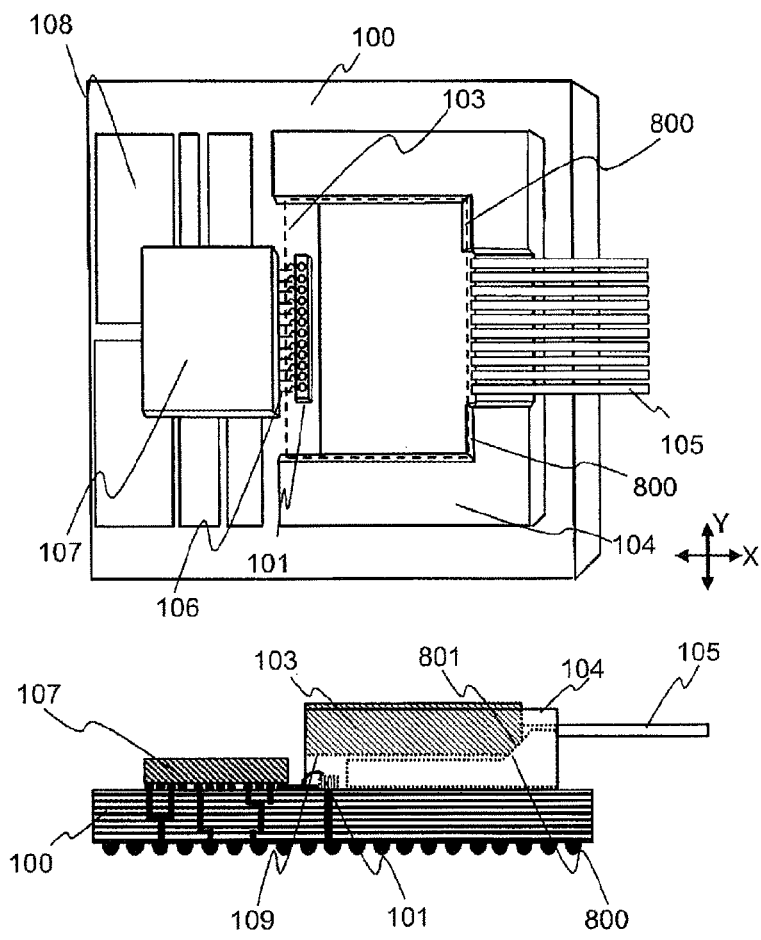
FIG. 8 shows top and sectional views of a parallel optical module according to a sixth embodiment of the present invention.

FIG. 8 shows top and sectional views of a parallel optical module according to a sixth embodiment of the present invention. In the embodiment, an optical connector 103 to be fitted to an engaging member 104 placed on a substrate 100 has an enneahedron shape. As shown in the sectional view in FIG. 8, a side wall of a groove in the engaging member 104 has a fifth surface 801 adjacent to a second surface which is one of the surfaces of the optical connector 103. The second surface adjoins a first surface 109 which faces an optical element array 101 in the direction perpendicular to the substrate. The fifth surface 801 adjoins the second surface at a ninety degree angle in a horizontal direction of the optical connector 103. In this configuration, the fifth surface 801 of the optical connector 104 is fitted onto a side wall surface 800 of the engaging member, to accomplish positioning in X-direction.

With this configuration, highly accurate optical positioning is achieved, with respect to horizontal misalignment between the optical element array 101 and the optical fiber 105, in the both directions of channel arrangement (Y-direction) and of the optical axis of the optical fiber (X-direction).

Seventh Embodiment

Figure 10:
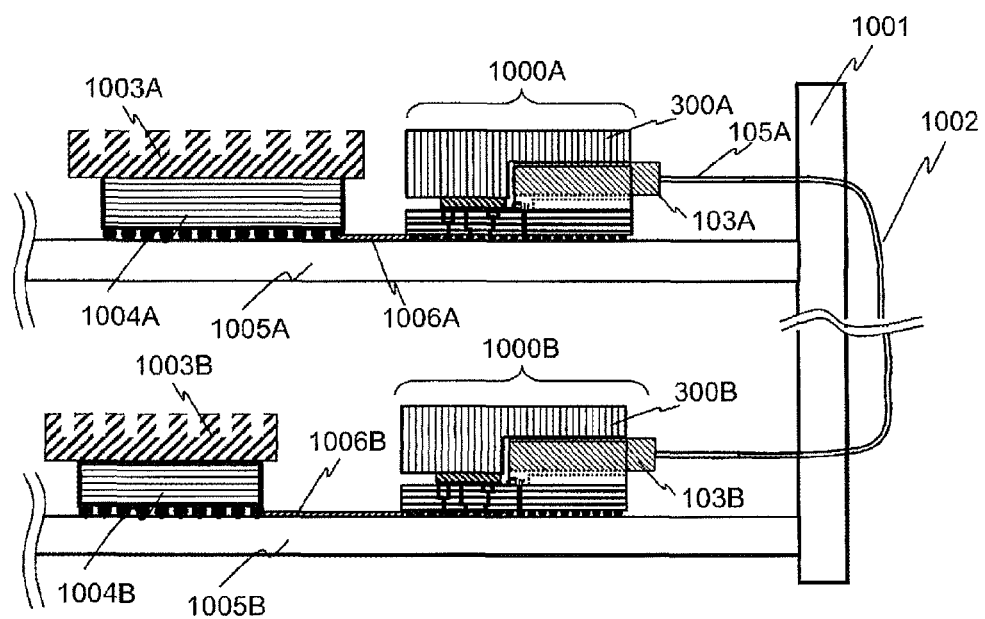
FIG. 10 is a sectional view showing an example of a device including an optical interconnection system board according to a seventh embodiment of the present invention. In the device, the optical interconnection system board is connected to a backplane. A parallel optical module of the present invention is placed on the optical interconnection system board.

FIG. 10 is a sectional view showing an example of a device including an optical interconnection system board according to a seventh embodiment of the present invention. In the device, the optical interconnection system board is connected to a backplane. A parallel optical module of the present invention is placed on the optical interconnection system board.

In the example shown here, the parallel optical module of the present invention is placed on the optical interconnection system boards 1005A, 1005B which are individually connected to the backplane 1001.

As shown in FIG. 10, an electric signal input to/output from an LSI package 1004 on the optical interconnection system board 1005A is electrically connected to the parallel optical module 1000A via electric wiring 1006A on the board 1005A. Further, the electric signal passes through an integrated circuit element in the parallel optical module 1000A, to be photoelectrically converted at a light-emitting element array, and then propagates, as an optical signal, in an optical fiber 105A via an optical connector 103A. In addition, the optical fibers 105A, 1002 are connected to the parallel optical module 1000B placed on another board 1005B, via the backplane 1001, whereby the optical signal is transmitted/received.

Furthermore, the parallel optical modules 1000A, 100B including a metal member 300 placed directly above the integrated circuit element, which has been described in the second embodiment, is constructed on the optical interconnection system boards 1005A, 1005B. This enables the optical module to radiate heat simultaneously with other LSI packages 1004A, 1004B, by air cooling using a fan and the like. As a result, a simple but dense package configuration of an optical module on a board is achieved, which, accordingly, reduces power requirement of a system.

Eighth Embodiment

Figure 11:
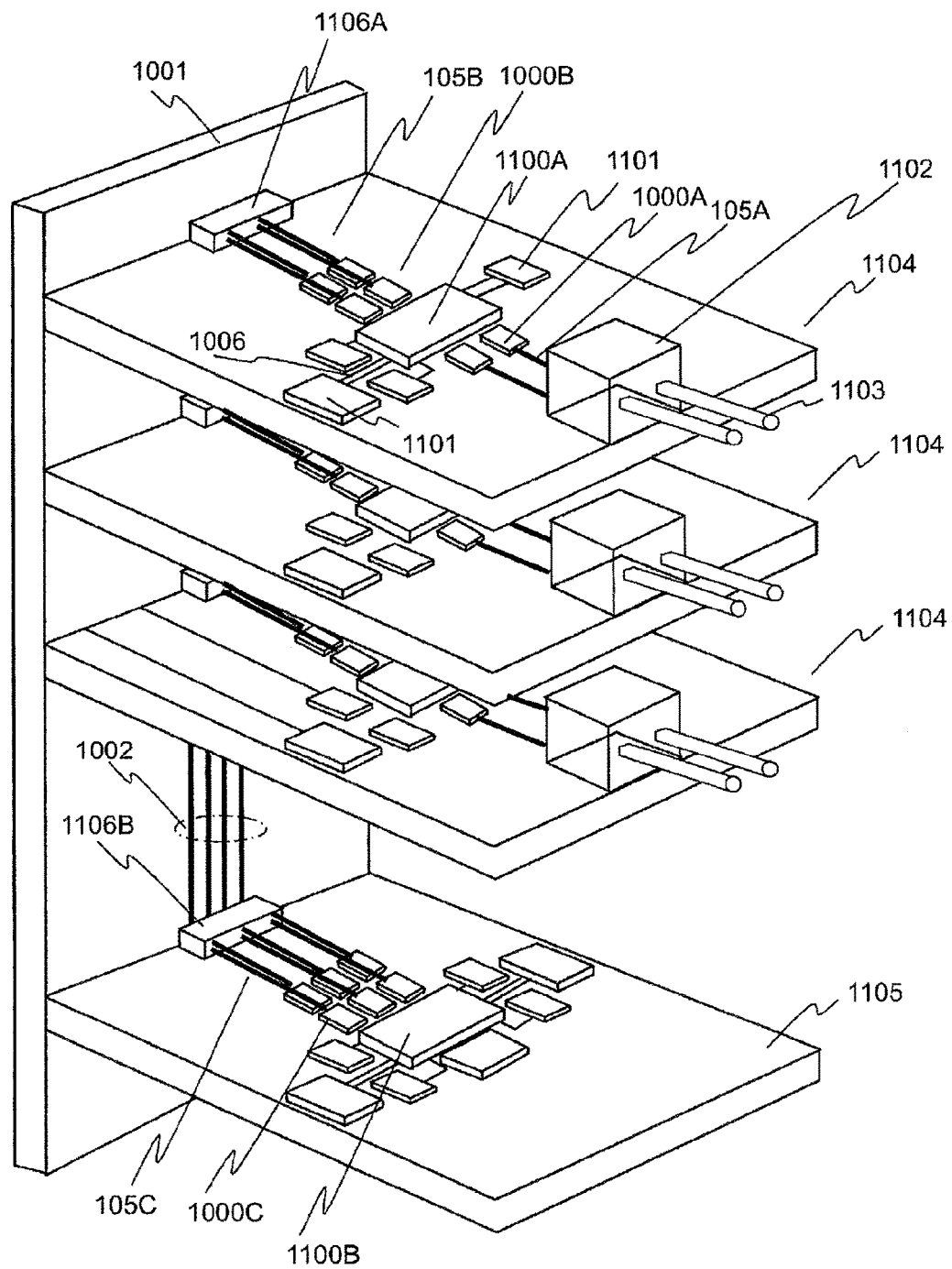
FIG. 11 is a full perspective view showing an example of a device according to an eighth embodiment of the present invention. The device includes the optical interconnection system board of the present invention.

FIG. 11 is a full perspective view showing an example of a device according to an eighth embodiment of the present invention. The device includes the optical interconnection system board of the present invention.

In the example shown here, a parallel optical module of the present invention is mounted on an optical interconnection system board 1104 which is individually connected to a backplane 1001. As shown in FIG. 11, an optical signal to be transmitted to the outside of a substrate is transmitted from a front part of the board such as Ethernet (registered trademark) to a parallel optical module 1000A via an optical connector 1102, and an optical fiber 105A. The optical signal is converted to an electric signal in the parallel optical module 1000A. The electric signal is processed in an integrated circuit 1100 and then converted to an optical signal in the parallel optical module 1000B. The optical signal is optically connected to an optical connector 1106 on the backplane side, via an optical fiber 105B. Furthermore, the optical signals from each of the optical interconnection system boards 1104 are collected at a switch card 1105, via an optical fiber 1002 on the backplane. Subsequently, the optical signal is optically connected to a parallel optical module 1000C, via an optical fiber 105C placed on the switch card 1105. The signal is then processed in an integrated circuit 1100C such as a switch LSI, to be input/output to the optical interconnection system board 1104 again, via a parallel optical module 1000C. With this configuration, there is constructed a high-speed and large-capacity optical interconnection system to which a parallel optical module of the present invention is applied.

REFERENCE SIGNS LIST 100 substrate
101, 101A optical element array
103, 103A, 103B, 1102 optical connector
104, 104A engaging member
105, 105A, 105B, 105C, 1002, 1103 optical fiber
106, 108, 302, 1006, 1006A, 1006B electric wiring
109 first surface of optical connector
110 second surface of optical connector
111 fourth surface of optical connector
112 third of optical connector
200 first bottom surface of engaging member
201, 201A first groove portion of engaging member
203 second groove portion of engaging member
204 third groove portion of engaging member
300, 300A, 300B metal member
301, 600 wire
303 solder bump
500, 500A hollow wall
601 adhesive
602, 900 optical signal
700 projection part of optical connector
800 side wall surface of engaging member
801 fifth surface of optical connector
901 optical path conversion mirror
902 lens member
1000A, 1000B, 1000C parallel optical module
1001 backplane
1003A, 1003B heat radiation fin
1004A, 1004B LSI package
1005A, 1005B, 1104 optical interconnection system board
1100A, 1100B integrated circuit
1101 peripheral circuit
1105 switch card

The invention claimed is:

1. A transmitting device using an optoelectric hybrid circuit board and an optical module,
the optical module comprising:
a substrate,
an optical element placed on the substrate,
an optical connector configured to optically connect the optical element and an external optical fiber, the optical connector having a tapered surface placed in a bilaterally symmetrical manner with respect to a bottom surface of the optical connector; and
an engaging member placed on the substrate, the engaging member having a surface facing the tapered surface, and being configured to be fitted with the optical connector,
wherein the optical connector has an underside surface facing the engaging member, and a top surface located on the opposite side of the underside surface, the top surface having a larger area than the underside surface,
the optoelectric hybrid circuit board comprising:
a board;
an LSI package including an integrated circuit element sealed on the board; and
a plurality of the optical modules placed on the board,
wherein the LSI package and the optical module are electrically connected by electric wiring provided on the board,
an electric signal from the LSI package is converted to an optical signal by the optical module, and
the optical signal is transmitted through an external optical fiber provided on the board, and
the transmitting device comprising:
a first circuit board on which a first signal processing part is mounted, the first signal processing part being configured to process an optical signal input from outside;
the optoelectric hybrid circuit board being a second circuit board having a second signal processing part configured to process an optical signal transmitted from the first circuit board via an optical fiber; and
a backplane on which optical wiring is placed, the optical wiring optically connecting the first circuit board and the second circuit board.

2. The transmitting device of claim 1, wherein
the optical connector includes another tapered surface, each of the tapered surfaces being adjacent to the bottom surface, and both a first angle between the tapered surface and the underside surface, and a second angle between the other tapered surface and the underside surface are obtuse angles.

3. The transmitting device of claim 1, wherein the optical connector is an octahedron.

4. The transmitting device of claim 1, further comprising a drive circuit placed on the substrate, the drive circuit being configured to drive the optical element, wherein
an optical element array is located between the engaging member and the drive circuit.

5. The transmitting device of claim 4, further comprising a metal member placed on the drive circuit, wherein
the metal member covers the integrated circuit, the optical element, and a part of the optical connector.

* * * * *